UNITED STATES PATENT OFFICE.

WALDEMAR ASEF, OF PHILADELPHIA, PENNSYLVANIA.

PROCESS OF MAKING PURE ZINC OXID AND RECOVERING SUBSTANCES FROM WASTE AND LIKE LIQUORS.

1,135,981. Specification of Letters Patent. Patented Apr. 20, 1915.

No Drawing. Application filed July 19, 1913. Serial No. 780,015.

*To all whom it may concern:*

Be it known that I, Dr. WALDEMAR ASEF, a subject of the Emperor of Russia, residing in the city of Philadelphia, in the county of Philadelphia and State of Pennsylvania, have invented a certain new and useful Process of Making Pure Zinc Oxid and Recovering Substances from Waste and like Liquors, of which the following is a specification.

In certain metallurgical operations, such as the wet copper extraction process, there are produced liquors containing zinc salts, sodium chlorid and sodium sulfate. Such liquors sometimes contain in addition to the substances named, iron salts and possibly other substances as impurities, among which may be mentioned cobalt, manganese and nickel compounds. These liquors are types of those to which the invention is applicable and as has been said they occur in the arts frequently as waste liquors, being by-products, but the invention is, of course, applicable to liquors of the character named whether they be waste liquors or not.

For the sake of further description it may be said that, in the manufacture of sulfuric acid, a by-product is produced in the pyrites burners which is known as "cinders", which is treated for the extraction of copper by the wet process which results in the production of waste liquor of the kind above referred to and to the treatment of which the present invention is applicable.

Generally stated the object of the present invention is to recover from liquors of the kind described, as well as from equivalent liquors, pure oxid of zinc and to recover, if desired, iron in the form of ferric compounds and to recover chlorid of sodium and sulfate of sodium and to re-use the caustic alkali that is employed as a re-agent in the process, thus avoiding expense and waste.

The invention will first be described in connection with a liquor containing possibly impurities and zinc salts, sodium or potassium chlorid and sodium sulfate, and ferrous salts; it will then be described in connection with such a liquor from which the iron compounds are absent, and it will then be described in connection with one of its steps for producing pure oxid of zinc from liquors of the same general class but varying perhaps in details from those mentioned. Before describing the invention it may be said that sodium or potassium compounds may be involved. Whether the compounds be of sodium or potassium is more or less accidental, for example, in the United States they would probably, at the present time, be sodium compounds, whereas in certain foreign countries they would possibly be potassium compounds. The point is that in the present invention sodium and potassium compounds are equivalents and where one is mentioned in either the description or the claims, it is to be understood that the other is included.

The liquor containing zinc salts, and sodium or potassium chlorid, and sodium or potassium sulfate, and ferrous salts and doubtless impurities, is treated for the separation and removal or recovery of the iron salts. To do this the liquor which may for the sake of identification be called the waste liquor is treated with hydrate or carbonate of alkali metal or of alkaline earth metal, with the result that the iron and zinc are precipitated as ferrous and zinc hydrate or basic carbonate. The precipitate is oxidized as by the appropriate application of air or other oxidizing agent in order to convert the ferrous hydrate to ferric hydrate. Upon the completion of this oxidization, more waste liquor, sufficient to dissolve the zinc hydroxid, is added while air is blown through the liquor. In this way the zinc hydroxid or basic zinc carbonate goes into solution and the ferric hydroxid derived from the ferrous compounds of the added waste liquor is precipitated, adding itself to the previously precipitated ferric hydroxid.

The iron hydroxid or hydrated iron oxid, free from zinc hydroxid, can be removed, leaving what may be called a zinc solution free from iron compounds and containing among other things a zinc compound or compounds. From this zinc solution are precipitated manganese, cobalt and nickel as peroxids by means of an appropriate hypochlorite. By filtering off the peroxids there is left a solution of zinc salt, sodium chlorid and sodium sulfate. From this solution the zinc is precipitated by a hydrate or carbonate of an alkali as zinc hydroxid or basic zinc carbonate which is filtered producing as the precipitate, zinc hydroxid or basic zinc carbonate and as the filtrate, a solution containing sodium chlorid and sodium sulfate. The zinc oxid produced from the basic zinc carbonate or zinc hydroxid as by heat or ignition, is not pure enough for certain purposes; for example, it is not pure enough to be suitable for use as a pigment or for other commercial uses where a high degree of purity is required. In order to purify the zinc oxid it is treated hot or cold with a concentrated solution of caustic alkali. One example of a concentrated solution of caustic is about 600 grams per liter. As a result the zinc oxid goes into solution as zincate. This zincate solution is then diluted with, for example, three volumes of the filtrate above referred to and containing sodium chlorid and sodium sulfate, and the impurities are removed as by filtration. Some of the impurities last referred to were present in the caustic alkali and were introduced along with it. These consist of iron compounds which are usually present in commerical caustic alkali, but the crude zinc oxid also contains calcium compounds as impurities, for instance, calcium carbonate, which does not dissolve in the caustic alkali solution. The liquid containing the zincate solution, freed from impurities, is boiled and again diluted with five volumes of the filtrate above referred to and containing sodium chlorid and sodium sulfate. The result of the second dilution, and of boiling and stirring this solution is that zinc oxid is precipitated and this precipitate is called zinc oxid rather than zinc hydroxid, because by heating to about 150° C. it loses its water, whereas zinc hydroxid must be ignited in order to get out the combined water. Probably this substance should be called hydrated zinc oxid, if that term is understood as above described. After filtering and washing and drying this zinc oxid is practically chemically pure and suitable for any commercial use requiring a high degree of purity. If preferred the zinc hydroxid which was precipitated along with the iron can be separated therefrom by dissolving it in the caustic solution as zincate. This zincate solution can be treated as above for the recovery of pure zinc oxid. By evaporating the filtrate or liquor from which the zinc oxid was precipitated, the sodium chlorid, sodium sulfate and caustic alkali can be recovered. It may be remarked that the caustic alkali so recovered can be used over and over again for the extraction of more zinc oxid in a repetition of the described process. The sodium chlorid and sodium sulfate can be recovered together or separately as may be required, thus reducing the cost of the process.

If the liquors to be treated contain zinc salts and sodium or potassium chlorid and sodium sulfate, but no iron compounds, the described step for the separation of the iron from the zinc is, of course, unnecessary and the zinc is precipitated as above described and extracted with caustic alkali as above described. Instead of doing this the zinc can be recovered by electrolytic deposition or electroplating, but in such case the metallic zinc obtained is spongy and can not be melted and therefore is not suitable for commercial use. However, this metallic zinc can be treated by dissolving it in caustic alkali with the evolution of hydrogen and from the zincate solution so formed, pure zinc oxid can be precipitated by dilution with a solution of sodium chlorid and sodium sulfate as above described. Furthermore in any instance pure zinc oxid can be precipitated from a zincate solution by means of sodium chlorid alone or sodium sulfate alone. It may be remarked that the solution in the above described process will contain sodium chlorid alone in cases where the sodium sulfate has been extracted and recovered, for example by the cooling process.

The saline solutions, which are employed for precipitating the pure zinc oxid from the zincate solution by dilution, do not in any case detract from the purity of the zinc oxid which is obtained free from sodium chlorid or sodium sulfate or both. The zinc compound recovered has been referred to as zinc oxid because by heating it to about 150° Cent. it loses its water.

It will be obvious to those skilled in the art that modifications may be made in the practice of the herein described process, but

Having thus described the invention, what I claim is:

1. The process of recovering pure zinc oxid from a zincate solution which consists in decomposing the solution by the addition of a solution of a salt or salts thereby precipitating pure zinc oxid and forming a caustic alkali solution in which said salt or salts are inert, recovering the pure zinc oxid, and evaporating the mother liquor to recover the caustic and the salt or salts.

2. The process of recovering pure zinc oxid which consists in precipitating it from a zincate solution by the addition of a solution of sodium chlorid, thereby forming a caustic alkali solution, and evaporating the mother liquor to recover the caustic which was combined with the zinc oxid and the sodium chlorid which was in the added solution.

3. The process of recovering pure zinc oxid which consists in precipitating it from a zincate solution by the addition of a solution of sodium chlorid and sodium sulfate thus forming a caustic alkali solution, and evaporating the mother liquor to recover the caustic alkali which was combined with the zinc oxid and the sodium chlorid or sodium sulfate which were in the added solution.

4. The process of making pure zinc oxid which consists in making a zincate solution and diluting it with a solution of a salt or salts which is inert in the caustic solution hereinafter referred to, filtering the same to remove impurities, additionally diluting the solution with more of the saline solution, and boiling and stirring it to precipitate pure zinc oxid and form a solution of caustic alkali, recovering the pure zinc oxid, and evaporating the mother liquor to recover the salts and the caustic.

5. The process of recovering pure zinc oxid and other substances from waste and like liquors containing zinc, sodium and iron salts which consists in treating the liquor with an alkali metal compound adapted to precipitate zinc and iron compounds, subjecting the liquor and precipitate to an oxidizing agent and diluting it with more of the original liquor to convert the precipitated iron compounds to the ferric state and to dissolve the precipitated zinc compounds, separating the liquor from the precipitated ferric compounds, treating the liquor with an alkali metal compound adapted to precipitate zinc compounds and obtain a filtrate containing sodium salts, separating the liquor from the zinc compounds and saving some of the liquor, adding to the liquor previously precipitated zinc compound dissolved in caustic alkali and purified as described by dilution with previously saved filtrate containing sodium salts, and boiling and agitating the mass thereby precipitating pure zinc oxid, separating the liquor from the zinc oxid precipitate, and evaporating the liquor for the recovery of caustic alkali and salts.

6. The process of recovering pure zinc oxid and other substances from waste and like liquors containing zinc, sodium and iron salts, which consists in treating the liquor with an alkali metal compound adapted to precipitate zinc and iron compounds, subjecting the liquor and precipitate to an oxidizing agent and diluting it with more of the original liquor to convert the precipitated iron compounds to the ferric state and to dissolve the precipitated zinc compounds, separating the liquor from the precipitated ferric compounds, purifying the liquor by treating it with a hypochlorite to precipitate manganese, cobalt and nickel and removing the same from the liquor, treating the liquor with an alkali metal compound adapted to precipitate zinc compounds and obtain a filtrate containing sodium salts, separating the liquor from the zinc compounds and saving some of the liquor, adding to the liquor previously precipitated zinc dissolved in caustic alkali and purified by dilution with previously saved filtrate containing sodium salts and precipitating pure zinc oxid, separating the liquor from the zinc oxid precipitate, and evaporating the liquor for the recovery of caustic alkali and salts.

7. The process of recovering pure zinc oxid and other substances from waste and like liquors containing zinc and sodium salts, which consists in treating the liquor with an alkali metal compound adapted to precipitate zinc compounds and obtain a filtrate containing sodium salts, separating the liquor from the zinc compounds and saving some of the filtrate, adding to the liquor previously precipitated zinc compounds dissolved in caustic alkali and purified by dilution with previously saved filtrate and thereby precipitating pure zinc oxid, separating the liquor from the zinc oxid precipitate, and evaporating the liquor for the recovery of caustic alkali and salts.

8. In the process of recovering pure zinc oxid and other substances from waste and like liquors containing zinc, sodium and iron salts, the improvement which consists in treating the liquor with an alkali metal compound adapted to precipitate zinc and iron compounds, subjecting the precipitate to an oxidizing agent to convert ferrous into ferric substances and afterward and in the presence of an oxidizing agent treating the precipitate with more of the first mentioned or waste liquor to dissolve the precipitated zinc substance and to precipitate the iron compounds of the waste or first mentioned liquor last employed and to convert the last mentioned iron compounds into the ferric state, and separating the liquor from the precipitated ferric compound.

In testimony whereof I have hereunto signed my name.

Dr. WALDEMAR ASEF.

Witnesses:
RETTA M. BECK,
FRANK E. FRENCH.